(12) United States Patent
Durand et al.

(10) Patent No.: US 7,809,946 B2
(45) Date of Patent: *Oct. 5, 2010

(54) SECURE AUTHENTICATED CHANNEL

(75) Inventors: Alain Durand, Rennes (FR);
Jean-Pierre Andreaux, Amsterdam (NL); Thomas Sirvent, Viarmes (FR)

(73) Assignee: Thomson Licensing, Boulogne Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/288,795

(22) Filed: Oct. 23, 2008

(65) Prior Publication Data

US 2009/0063863 A1 Mar. 5, 2009

Related U.S. Application Data

(62) Division of application No. 10/978,162, filed on Oct. 29, 2004, now Pat. No. 7,545,932.

(51) Int. Cl.
*H04L 9/06* (2006.01)

(52) U.S. Cl. ............... 713/171; 713/155; 713/156; 713/168; 380/28; 380/44; 380/30

(58) Field of Classification Search ............... 713/171, 713/155–156, 168; 380/28, 30, 44
See application file for complete search history.

(56) References Cited

U.S. PATENT DOCUMENTS

| 5,737,419 | A  | * | 4/1998 | Ganesan ............... 713/169 |
| 5,889,865 | A  |   | 3/1999 | Vanstone et al. |
| 5,953,420 | A  |   | 9/1999 | Matyas, Jr. et al. |
| 2002/0057796 | A1 |   | 5/2002 | Lambert et al. |
| 2004/0081321 | A1 |   | 4/2004 | Struik |

* cited by examiner

*Primary Examiner*—Kambiz Zand
*Assistant Examiner*—Tongoc Tran
(74) *Attorney, Agent, or Firm*—Robert D. Shedd; Paul P. Kiel

(57) ABSTRACT

A protocol (i.e. method) and corresponding apparatuses for calculating a session key. Two peers with knowledge of a common Diffie-Hellman permanent key, $K_{perm}$, and the identity and public key of the other peer. A first peer chooses a first ephemeral private key x and calculates the first corresponding ephemeral public key $g^x$, which is sent to the second peer. The second peer calculates a second ephemeral public key $g^y$ in the same manner, and an ephemeral shared key $K_{eph}$, hashes $g^y$, $K_{eph}$, $K_{perm}$, and its identity, and sends $g^y$ and the hash to the first peer. The first peer calculates $K_{eph}$, verifies the hash, and hashes $g^x$, $K_{eph}$, $K_{perm}$, and its identity, and sends it to the second peer that verifies this hash. Thereafter, both peers obtain a session key by hashing $K_{eph}$. The apparatuses may then use the session key to establish a secure authenticated channel (SAC).

5 Claims, 6 Drawing Sheets

SECURE AUTHENTICATED CHANNEL

This application is a divisional of U.S. application Ser. No. 10/978,162, now U.S. Pat. No. 7,545,932, filed Oct. 29, 2004, herein incorporated by reference.

TECHNICAL FIELD OF THE INVENTION

The invention relates generally to secure authenticated channels, and in particular to calculation of session keys for establishment of such channels for protection of digital content, for example in a digital television system.

BACKGROUND OF THE INVENTION

Secure authenticated channels, well known in the art of cryptography, are established to allow two mutually authenticated devices (often called peers) to exchange information confidentially. A secure authenticated channel should preferably have the following characteristics:
mutual authentication of the peers;
key confirmation, i.e. a common secret is established and at least one peer is able to verify that the secret indeed is common;
forward secrecy, i.e. old session keys cannot be calculated even when long-term secret keys (such as certificate secret keys) are known.

These characteristics can be formally proven mathematically, and it has been proven that if there exists a way to circumvent one of the above characteristics for a given cryptographic protocol, then the whole protocol may be broken with relative ease.

Over the years, the cryptographic community has proposed many protocols for secure authenticated channels. Only a few of these channels have been proven to fulfill the characteristics above.

The protocols that do provide channels with the required characteristics all use a number of different cryptographic primitives: at least one asymmetric primitive (such as asymmetric encryption or digital signature), hash functions, Message Authentication Code (MAC), and, in some of them, other primitives such as symmetric encryption. A problem with these protocols is that they are quite resource consuming and are as such difficult to implement in a device with limited computing capabilities, such as for example a portable security module, like a smart card. Another problem is that the use of many cryptographic primitives makes it difficult to prove that a protocol is secure.

The present invention provides a secure access channel protocol that has the required characteristics and that is particularly suitable for implementation in a device with limited computing capabilities.

Throughout the description, it will be assumed that, as cryptography is a mature art, the basic concepts are well known. These concepts will for reasons of clarity and succinctness not be described more than necessary for the comprehension of the invention.

SUMMARY OF THE INVENTION

In a first aspect, the invention is directed to a method of calculating a session key shared by a first and a second device. The first device has knowledge of an identity corresponding to itself ($ID_a$) and an identity corresponding to the second device ($ID_b$), and an agreed key ($K_{perm}$) common to both devices, while the second device has corresponding knowledge. The first device chooses a first ephemeral private key (x), calculates a first ephemeral public key ($g^x$), and sends the first ephemeral public key ($g^x$) to the second device. Upon reception of the first ephemeral public key ($g^x$), the second device chooses a second ephemeral private key (y), calculates a second ephemeral public key ($g^y$), calculates an ephemeral shared key ($K_{eph}$) from the first ephemeral public key ($g^x$) and the second ephemeral private key (y), and calculates a first value ($H_1$) from the second ephemeral public key ($g^y$), the ephemeral shared key ($K_{eph}$), the agreed key ($K_{perm}$), and the identity corresponding to itself ($ID_b$), and sends the second ephemeral public key ($g^y$) and the first value ($H_1$) to the first device. Upon reception of the second ephemeral public key ($g^y$) and the first value ($H_1$) from the second device, the first device calculates the ephemeral shared key ($K_{eph}$) from the second ephemeral public key ($g^y$) and the first ephemeral private key (x), verifies the first value ($H_1$), calculates a second value ($H_2$) from the first ephemeral public key ($g^x$), the ephemeral shared key ($K_{eph}$), the agreed key ($K_{perm}$), and the identity corresponding to itself ($ID_a$), sends the second value ($H_2$) to the second device, and calculates a session key ($K_{sess}$) as a function of the ephemeral shared key ($K_{eph}$). The second device receives the second value ($H_2$), verifies the second value ($H_2$), and calculates the session key ($K_{sess}$) as a function of the ephemeral shared key ($K_{eph}$).

In a preferred embodiment, the method is aborted if a verification fails.

In a preferred embodiment, the first value ($H_1$), the second value ($H_2$), and the session key ($K_{sess}$) are calculated using hash functions.

In a further preferred embodiment, the hash functions used to calculate $H_1$, $H_2$, and $K_{sess}$ are the same.

In a second aspect, the invention is directed to a first device for participating, with a second device, in the calculation of a shared session key. The first device has knowledge of an identity corresponding to itself ($ID_a$) and an identity corresponding to the second device ($ID_b$), and an agreed key ($K_{perm}$) common to both devices. The first device comprises a processor for choosing an ephemeral private key (x); calculating a first ephemeral public key ($g^x$); sending the first ephemeral public key ($g^x$) to the second device; receiving a second ephemeral public key ($g^y$) and a first value ($H_1$) calculated from the second ephemeral public key ($g^y$), an ephemeral shared key ($K_{eph}$), the agreed key ($K_{perm}$), and the identity corresponding to the second device ($ID_b$) from the second device; calculating the ephemeral shared key ($K_{eph}$) from the ephemeral private key (x) and the second ephemeral public key ($g^y$); verifying the first value ($H_1$); calculating a second value ($H_2$) from the first ephemeral public key ($g^x$), the ephemeral shared key ($K_{eph}$), the agreed key ($K_{perm}$), and the identity corresponding to the first device ($ID_a$); sending the second value ($H_2$) to the second device; and calculating a session key ($K_{sess}$) as a function of the ephemeral shared key ($K_{eph}$).

In a third aspect, the invention is directed to a second device for participating, with a first device, in the calculation of a shared session key. The second device has knowledge of an identity corresponding to itself ($ID_b$) and an identity corresponding to the first device ($ID_a$), and an agreed key ($K_{perm}$) common to both devices. The second device comprises a processor for receiving from the first device a first ephemeral public key ($g^x$); choosing an ephemeral private key (y); calculating a second ephemeral public key ($g^y$); calculating an ephemeral shared key ($K_{eph}$); calculating a first value ($H_1$) from the second ephemeral public key ($g^y$), the ephemeral shared key ($K_{eph}$), the agreed key ($K_{perm}$), and the identity corresponding to the second device ($ID_b$); sending the second ephemeral public key ($g^y$) and the first hash value ($H_1$) to the first device; receiving a second value ($H_2$) calculated from the first ephemeral public key ($g^x$), the ephemeral shared key ($K_{eph}$), the agreed key ($K_{perm}$), and the identity corresponding to the first device ($ID_a$) from the first device; verifying the second value ($H_2$); and calculating a session key ($K_{sess}$) as a function of the ephemeral shared key ($K_{eph}$).

In preferred embodiments, the processor in the devices of the second and third aspect aborts the calculation if a hash value is not successfully verified.

In a fourth aspect, the invention is directed to a method of calculating a session key common to a first and a second device. The first device has a certificate ($C_a$) comprising a public key ($g^a$) and an identity corresponding to itself ($ID_a$), and knowledge of the identity corresponding to itself ($ID_a$), a private key (a), and the public key ($g^a$). The second device has a corresponding certificate and knowledge. The first device chooses a first ephemeral private key (x), calculates a first ephemeral public key ($g^x$), and sends its certificate ($C_a$) and the first ephemeral public key ($g^x$) to the second device. Upon reception of the certificate of the first device ($C_a$) and the first ephemeral public key ($g^x$), the second device verifies the certificate of the first device ($C_a$), chooses a second ephemeral private key (y), calculates a second ephemeral public key ($g^y$), calculates an ephemeral shared key ($K_{eph}$) from the first ephemeral public key ($g^x$) and the second ephemeral private key (y), calculates a permanent key ($K_{perm}$) from the public key of the first device ($g^a$) and its own private key (b), calculates a first value ($H(g^y, K_{eph}, K_{perm}, ID_b)$) from the second ephemeral public key ($g^y$), the ephemeral shared key ($K_{eph}$), the permanent key ($K_{perm}$), and the identity corresponding to itself ($ID_b$), and sends its certificate ($C_b$), the second ephemeral public key ($g^y$) and the first value ($H(g^y, K_{eph}, K_{perm}, ID_b)$) to the first device. Upon reception of the certificate of the second device ($C_b$), the second ephemeral public key ($g^y$) and the first value ($H(g^y, K_{eph}, K_{perm}, ID_b)$) from the second device, the first device verifies the certificate of the second device ($C_b$), calculates the ephemeral shared key ($K_{eph}$) from the second ephemeral public key ($g^y$) and the first ephemeral private key (x), calculates the permanent key ($K_{perm}$) from the public key of the first device ($g^b$) and its own private key (a), verifies the first value ($H(g^y, K_{eph}, K_{perm}, ID_b)$), calculates a second value ($H(g^x, K_{eph}, K_{perm}, ID_a)$) from the first ephemeral public key ($g^x$), the ephemeral shared key ($K_{eph}$), the permanent key ($K_{perm}$), and the identity corresponding to itself ($ID_a$), and sends the second value ($H(g^x, K_{eph}, K_{perm}, ID_a)$) to the second device. Upon reception of the second value ($H(g^x, K_{eph}, K_{perm}, ID_a)$), the second device verifies the second value ($H(g^x, K_{eph}, K_{perm}, ID_a)$), and calculates a session key ($K_{sess}$) as a function of the ephemeral shared key ($K_{eph}$). The first device also calculates the session key ($K_{sess}$) as a function of the ephemeral shared key ($K_{eph}$).

In a fifth aspect, the invention is directed to a first device for participating, with a second device, in the calculation of a session key. The first device has a certificate ($C_a$) comprising a public key ($g^a$) and an identity corresponding to itself ($ID_a$), and knowledge of the identity corresponding to itself ($ID_a$), a private key (a), and the public key ($g^a$). The first device comprises a processor for choosing an ephemeral private key (x); calculating a first ephemeral public key ($g^x$); sending its certificate ($C_a$) and the first ephemeral public key ($g^x$) to the second device; receiving a certificate of the second device ($C_b$), a second ephemeral public key ($g^y$) and a first value ($H(g^y, K_{eph}, K_{perm}, ID_b)$) from the second device, the certificate ($C_b$) comprising a public key ($g^b$) and an identity of the second device ($ID_b$), and the first value ($H(g^y, K_{eph}, K_{perm}, ID_b)$) being calculated from the second ephemeral public key ($g^y$), an ephemeral shared key ($K_{eph}$), a permanent key ($K_{perm}$), and the identity corresponding to the second device ($ID_b$); verifying the certificate of the second device ($C_b$); calculating the ephemeral shared key ($K_{eph}$) from the second ephemeral public key ($g^y$) and the ephemeral private key (x); calculating the permanent key ($K_{perm}$) from the public key of the first device ($g^b$) and its own private key (a); verifying the first value ($H(g^y, K_{eph}, K_{perm}, ID_b)$); calculating a second value ($H(g^x, K_{eph}, K_{perm}, ID_a)$) from the first ephemeral public key ($g^x$), the ephemeral shared key ($K_{eph}$), the permanent key ($K_{perm}$), and the identity corresponding to itself ($ID_a$); sending the second value ($H(g^x, K_{eph}, K_{perm}, ID_a)$) to the second device; and calculating a session key ($K_{sess}$) as a function of the ephemeral shared key ($K_{eph}$).

In a sixth aspect, the invention is directed to a second device for participating, with a first device, in the calculation of a session key. The second device has a certificate ($C_b$) comprising a public key ($g^b$) and an identity corresponding to itself ($ID_b$), and knowledge of the identity corresponding to itself ($ID_b$), a private key (b), and the public key ($g^b$). The second device comprising a processor for receiving a certificate of the first device ($C_a$) and a first ephemeral public key ($g^x$), the certificate comprising a public key ($g^a$) and an identity of the first device ($ID_a$); verifying the certificate of the first device ($C_a$); choosing an ephemeral private key (y); calculating a second ephemeral public key ($g^y$); calculating an ephemeral shared key ($K_{eph}$) from the first ephemeral public key ($g^x$) and the ephemeral private key (y); calculating a permanent key ($K_{perm}$) from the public key of the first device ($g^a$) and its own private key (b); calculating a first value ($H(g^y, K_{eph}, K_{perm}, ID_b)$) from the second ephemeral public key ($g^y$), the ephemeral shared key ($K_{eph}$), the permanent key ($K_{perm}$), and the identity corresponding to itself ($ID_b$); sending its certificate ($C_b$), the second ephemeral public key ($g^y$) and the first value ($H(g^y, K_{eph}, K_{perm}, ID_b)$) to the first device; receiving a second value ($H(g^x, K_{eph}, K_{perm}, ID_a)$) from the first device, the second value being calculated from the first ephemeral public key ($g^x$), the ephemeral shared key ($K_{eph}$), the permanent key ($K_{perm}$), and the identity corresponding to the first device ($ID_a$); verifying the second value ($H(g^x, K_{eph}, K_{perm}, ID_a)$); and calculating the session key ($K_{sess}$) as a function of the ephemeral shared key ($K_{eph}$).

DETAILED DESCRIPTION OF THE INVENTION

The secure access channel protocol comprises two stages. The first stage is performed whenever a device is first introduced to another device. The second stage is performed when session key are to be exchanged.

Figure 1:
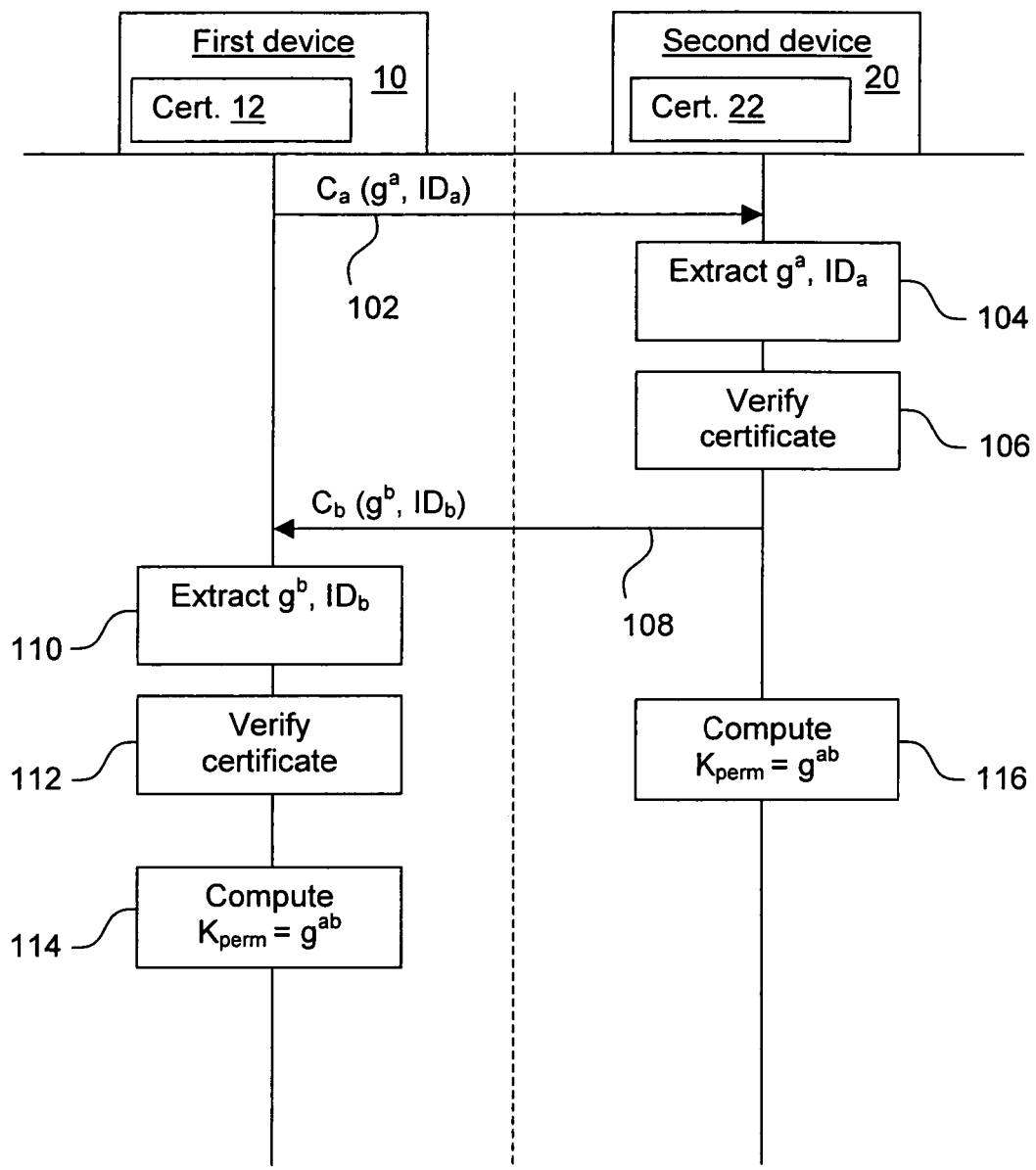
FIG. 1 illustrates the Authenticated Diffie-Hellman key agreement protocol as known in the prior art.

The first stage utilizes the Diffie-Hellman key agreement protocol illustrated in FIG. 1. The first device 10 starts the protocol by sending its certificate 12 (or one of its suitable certificates in case it has more than one) to the second device 20 in message 102. The certificate 12 comprises the first device's public key $g^a$ and an identity of the first device $ID_a$, preferably the serial number of the certificate 12. $g^a$ is a short notation for $g^a$ mod p, where a is the first device's private key, g is a known generator and p is a known prime number, as is well known in the art. This short notation is used throughout the description and, where applicable, in the claims and the drawings.

In step 104, the second device 20 extracts $g^a$ and $ID_a$, i.e. the first device's public key and identity. Then, in step 106, the second device 20 verifies that the certificate 12 is valid. Steps 104 and 106 may be performed in an inversed order The second device 20 then sends its certificate 22 (or one of its suitable certificates in case it has more than one) to the first device 10 in message 108. The certificate 22 comprises the second device's public key $g^b$ and an identity of the second device $ID_b$, preferably the serial number of the certificate 22.

In step 110, the first device 10 extracts $g^b$ and $ID_b$, i.e. the second device's public key and identity. Then, in step 112, the first device 10 verifies that the certificate is valid. Steps 110 and 112 may be performed in an inversed order.

In steps 114 and 116, the first device 10 and the second device 20 independently calculate the Diffie-Hellman permanent key 30 $K_{perm}=g^{ab}$; the first device 10 calculates $g^{ab}=(g^b)\hat{\ }a$, while the second device 20 calculates $g^{ab}=(g^a)\hat{\ }b$, where a is the first device's private key and b is the second device's private key.

Figure 2:
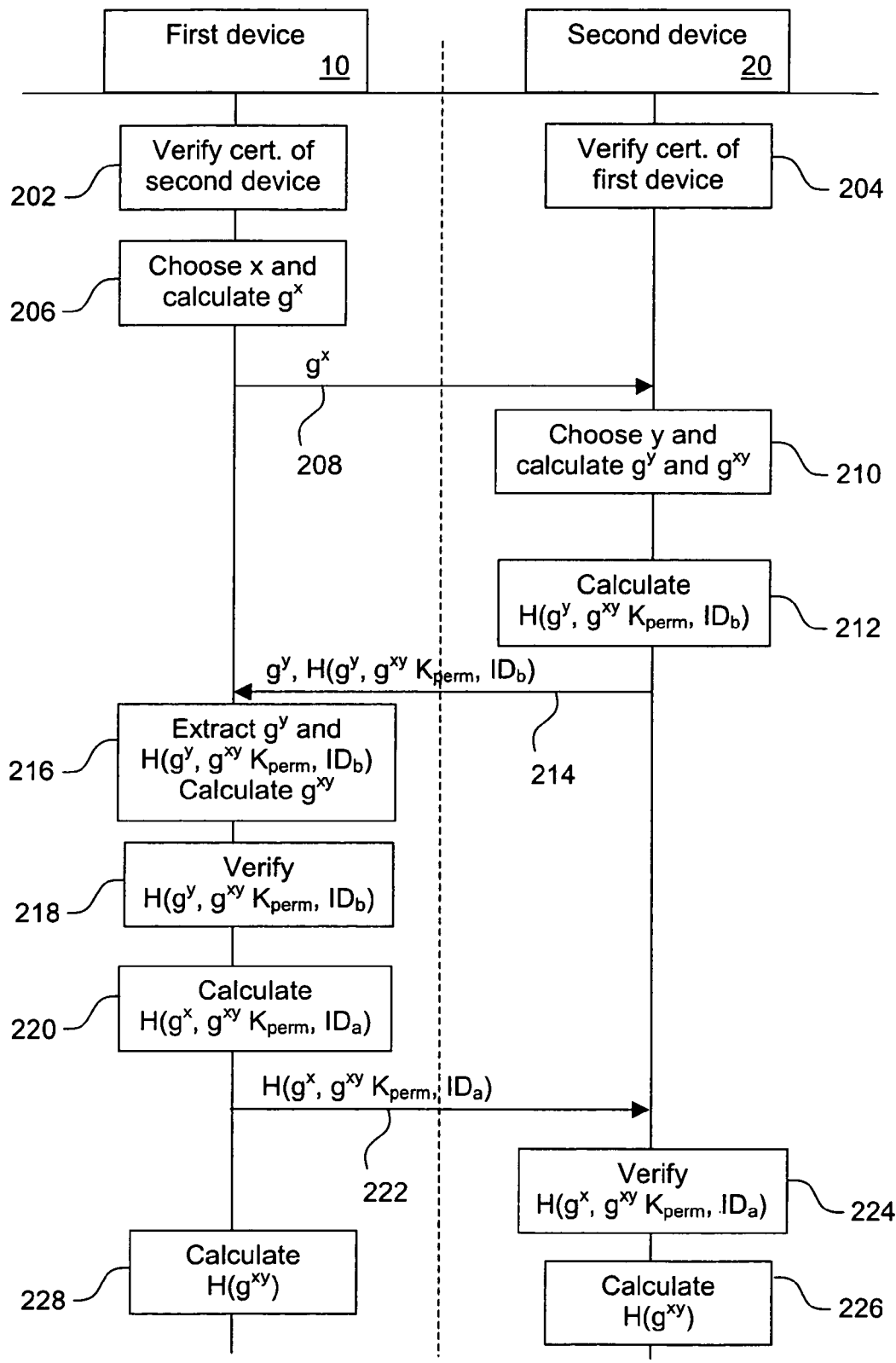
FIG. 2 illustrates the session key exchange according to a first embodiment of the present invention.

FIG. 2 illustrates the session key exchange according to a first embodiment of the present invention, i.e. stage two of the secure access channel protocol. It should be noted that the second stage may be performed immediately upon termination of stage one (in which case certain steps, such as the verification of the validity of the certificates in steps 202 and 204 hereinafter) may be omitted, and that stage two preferably also is performed at intervals, regular or irregular, to refresh (i.e. change) the session key.

In steps 202 and 204 the first device 10 and the second device 20 independently verify that the two certificates 12, 22 have not been revoked, i.e. that they are still valid. It should be noted that is preferable that both devices verify both certificates. If a device detects that either its own certificate or the received certificate has been revoked, then it aborts the protocol and refuses to establish any session key. In practice, a device will normally verify a certificate only when it is aware that the protocol has been initiated (in which case step 204 would be performed upon reception of message 208 hereinafter).

At this point, the first device 10 knows the identities $ID_a$, $ID_b$ of both devices, its own private key a and public key $g^a$, the second device's public key $g^b$, and the Diffie-Hellman permanent key $K_{perm}$. The second device 20 has the corresponding knowledge: $ID_a$, $ID_b$, b, $g^b$, $g^a$, and $K_{perm}$.

In step 206, the first device 10 chooses a, preferably, random value, x, and calculates $g^x$. The value $g^x$ is then sent to the second device 20 in message 208.

Upon reception of message 208, the second device 20 chooses a, preferably, random value, y, and calculates $g^y$ and $g^{xy}$, in step 210. In step 212, the second device then calculates a first hash value $H(g^y, g^{xy}, K_{perm}, ID_b)$ using the values $g^y$ and $g^{xy}$, the Diffie-Hellman permanent key $K_{perm}$, and the identity $ID_b$ that it communicated to the first device 10 during the first stage and a suitable hash function, for example one of the many functions known in the art. The second device 20 then sends the value $g^y$ and the first hash value $H(g^y, g^{xy}, K_{perm}, ID_b)$ to the first device 10 in message 214.

Upon reception of message 214, the first device 10 extracts $g^y$, and $H(g^y, g^{xy}, K_{perm}, ID_b)$ and computes the value $g^{xy}$ in step 216. In step 218, the first device 10 verifies the first hash value, using the same hash function as the second device 20. If the first hash value is not verified, then the first device 10 aborts the protocol, but if the first hash value is verified, then the first device 10 calculates a second hash value $H(g^x, g^{xy}, K_{perm}, ID_a)$ in step 220, using the values $g^x$, $g^{xy}$, the Diffie-Hellman permanent key $K_{perm}$ and the identity $ID_a$ that it communicated to the second device 20 during the first stage. The first device 10 sends the second hash value $H(g^x, g^{xy}, K_{perm}, ID_a)$ to the second device 20 in message 222.

Upon reception of the message 222, the second device 20 verifies the second hash value $H(g^x, g^{xy}, K_{perm}, ID_a)$ in step 224, using the same hash function as the one used by the first device 10 in step 220. If the second hash value is not verified, then the second device 20 aborts the protocol, but if the second hash value is verified, then the second device 20 calculates, in step 226, a session key $K_{sess}$ by calculating the hash value of $g^{xy}$.

After having sent message 222 to the second device 20, the first device 10 calculates, in step 228, the same session key $K_{sess}$ by calculating the hash value of $g^{xy}$ using the same hash function as that used by the second device 20 in step 226.

At this point, both the first and the second device 10, possess the session key $K_{sess}$ that can be used to protect information sent between them. With the protocol according to the invention, the confidentiality of the private keys is assured, the authentication and the key confirmation are mutual. Furthermore, the forward secrecy and the robustness against leakage of previous session key are assured as well. A person skilled in the art will appreciate that the three hash functions described in connection with steps 212, 220, and 226 may be different, the same, or that two of them are the same while the third is different.

Figure 3:
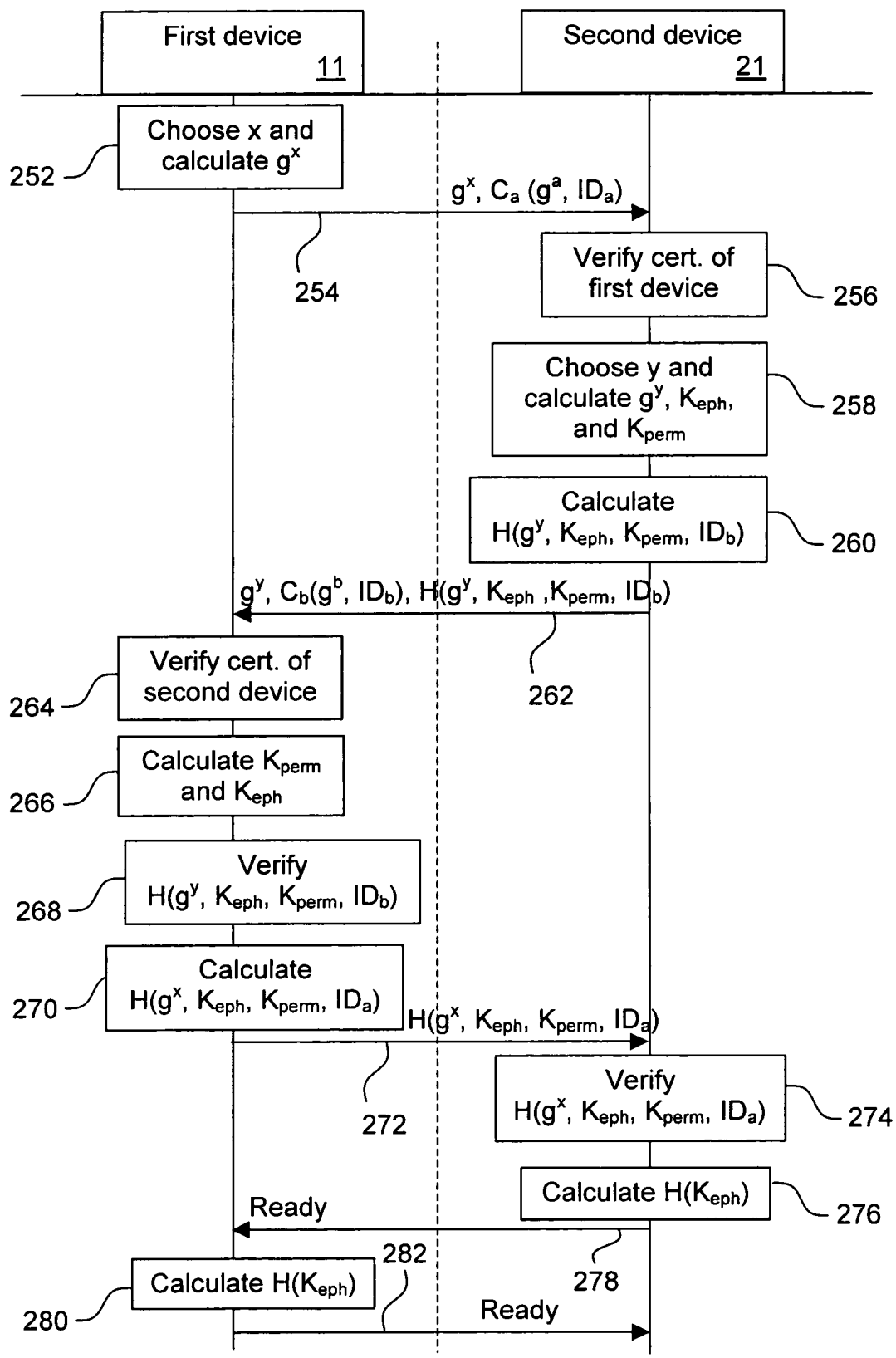
FIG. 3 illustrates the session key exchange according to a second embodiment of the present invention.

FIG. 3 illustrates the session key exchange according to a second embodiment of the present invention.

Before the start of the method, the first device 11 knows its identity $ID_a$, its own private key a and public key $g^a$. The second device 21 has the corresponding knowledge: $ID_b$, b, $g^b$. Certificates for the devices comprise the public key and the identity; $C_a(g^a, ID_a)$ and $C_b(g^b, ID_b)$, respectively.

In step 252, the first device 11 chooses, preferably randomly, a first ephemeral private key x and calculates an ephemeral public key $g^x$, that it sends together with its certificate $C_a(g^a, ID_a)$ to the second device 21 in message 254. Upon reception of message 254, the second device 21 verifies the certificate $C_a(g^a, ID_a)$ of the first device 11; step 256. If the verification is unsuccessful, the second device 21 abandons the method. However, if the verification is successful, then it chooses, preferably randomly, a second ephemeral private key y, and calculates a second ephemeral public key $g^y$, a ephemeral shared key $K_{eph}=g^{xy}$, and a Diffie-Hellman permanent key $K_{perm}=g^{ab}$, in step 258.

In step 260, the second device 21 then calculates a first hash value $H(g^y, K_{eph}, K_{perm}, ID_b)$ using the second ephemeral public key $g^y$, the ephemeral shared key $K_{eph}$, the Diffie-Hellman permanent key $K_{perm}$, and its identity $ID_b$, and a suitable hash function, for example one of the many functions known in the art. It should be known that other suitable functions than hash functions may be used for this and the following hash value calculations of the embodiment. The second device 21 then sends the second ephemeral public key $g^y$, its certificate $C_b(g^b, ID_b)$, and the first hash value $H(g^y, K_{eph}, K_{perm}, ID_b)$ to the first device 11 in message 262.

Upon reception of message 262, the first device 11 verifies the certificate $C_b(g^b, ID_b)$ of the second device 21; step 264.

If the verification is unsuccessful, the first device 11 abandons the method. However, if the verification is successful, the first device 11 computes the ephemeral shared key $K_{eph}$ and the Diffie-Hellman permanent key $K_{perm}$ in step 266. In step 268, the first device 11 verifies the first hash value, using the same hash function as the second device 21 used in step 260. If the first hash value is not verified, then the first device 11 aborts the method, but if the first hash value is verified, then the first device 11 calculates a second hash value $H(g^x, K_{eph}, K_{perm}, ID_a)$ in step 270, using the first ephemeral public key $g^x$, the ephemeral shared key $K_{eph}$, the Diffie-Hellman permanent key $K_{perm}$ and its identity $ID_a$. The first device 11 sends the second hash value $H(g^x, K_{eph}, K_{perm}, ID_a)$ to the second device 21 in message 272.

Upon reception of the message 272, the second device 21 verifies the second hash value $H(g^x, K_{eph}, K_{perm}, ID_a)$ in step 274, using the same hash function as the one used by the first device 10 in step 270. If the second hash value is not verified, then the second device 21 aborts the protocol, but if the second hash value is verified, then the second device 21 calculates, in step 276, a session key $K_{sess}$ by calculating the hash value of the ephemeral shared key $K_{eph}$. Then it sends a "ready" message 278 to the first device 11 to indicate that the second hash value $H(g^x, K_{eph}, K_{perm}, ID_a)$ has been successfully verified and the session key $K_{sess}$ has been calculated.

Upon reception of the "ready" message 278 from the second device 21, the first device 11 calculates, in step 280, the same session key $K_{sess}$ by calculating the hash value of the ephemeral shared key $K_{eph}$, using the same hash function as that used by the second device 21 in step 276. Then the first device 11 sends a "ready" message 282 to the second device 21 to indicate that it too has calculated the session key $K_{sess}$.

At this point, both the first device 11 and the second device 21 possess the session key $K_{sess}$ that can be used to protect information sent between them. With the protocol according to the invention, the confidentiality of the private keys is assured, the authentication and the key confirmation are mutual. Furthermore, the forward secrecy and the robustness against leakage of previous session key are assured as well. A person skilled in the art will appreciate that the three hash functions described in connection with steps 212, 220, and 226 may be different, the same, or that two of them are the same while the third is different.

DETAILED DESCRIPTION OF AN EXEMPLARY IMPLEMENTATION

The protocol according to the invention is particularly suitable in a system where one of the devices has limited calculation capacity, for example in a security module such as a smart card or a PC card. One field of application is thus content protection, such as in a digital television system, which will be used hereinafter as an example. In such a system, a secure authenticated channel is advantageously used for secure transmission from a security module to the television of the secret keys that allow access to digital content by descrambling the latter. As the features of a digital television system are well known in the art, they will usually only be described in more detail when this is relevant to the invention.

Figure 4:
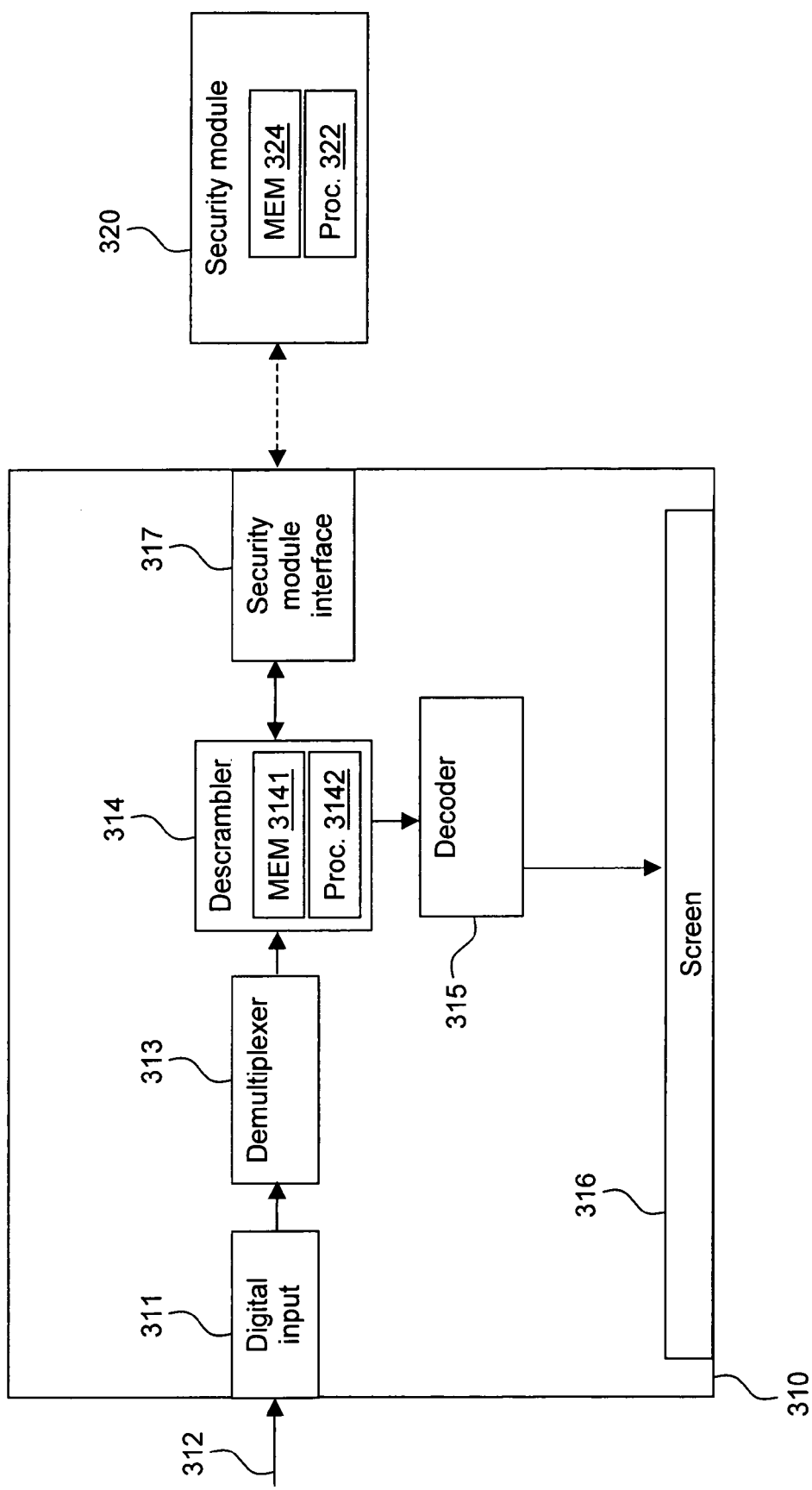
FIG. 4 schematically illustrates the architecture of the relevant parts of an exemplary system, a digital television system, for use with the invention.

FIG. 4 schematically illustrates the architecture of the relevant parts of an exemplary system, a digital television system, for use with the invention. A digital television set 310 comprises a digital input 311 for receiving scrambled digital content over connection 312. The digital input 311 is connected to a demultiplexer 313 for extracting content and Entitlement Control Messages (ECMs) from the digital content, and for forwarding this information to a descrambler 314. The descrambler 314 comprises a memory 3141 and a processor 3142 that, among other things, are used for establishing a secure authenticated channel, and is also for descrambling scrambled digital content. The descrambler 314 is also connected to a MPEG-2 decoder 315 for decoding descrambled digital content and for forwarding the decoded content to a screen 316 for display, and to a security module interface 317, such as for example a smart card reader. The security module interface 317 allows the digital television set 310 to interact with a security module 320 and to exchange standardized messages, preferably compliant with the ISO 7816-3 standard.

The security module 320 comprises a processor 322 and a memory 324, which among other things are used when establishing a secure authenticated channel according to the present invention.

The connection 312 is preferably a digital IEEE 1394 bus that carries digital audio/video content using the Advanced Television Systems Committee (ATSC) standard system. An ATSC transport stream comprises digital audio/video content and ECMs, of which the latter comprise code words for descrambling the audio/video content.

The establishment of the secure channel is executed by the processor 322 of the security module 320, normally using information stored in the memory 324, and, similarly, the processor 3142 of the descrambler 314 using information stored in the memory 3141. It should be noted that as the security module interface 317 acts as an interface (also called gateway) between the descrambler 314 and the security module 320 it will not be cited in the description of the protocol—it essentially only forwards information without changing it.

Figure 5A:
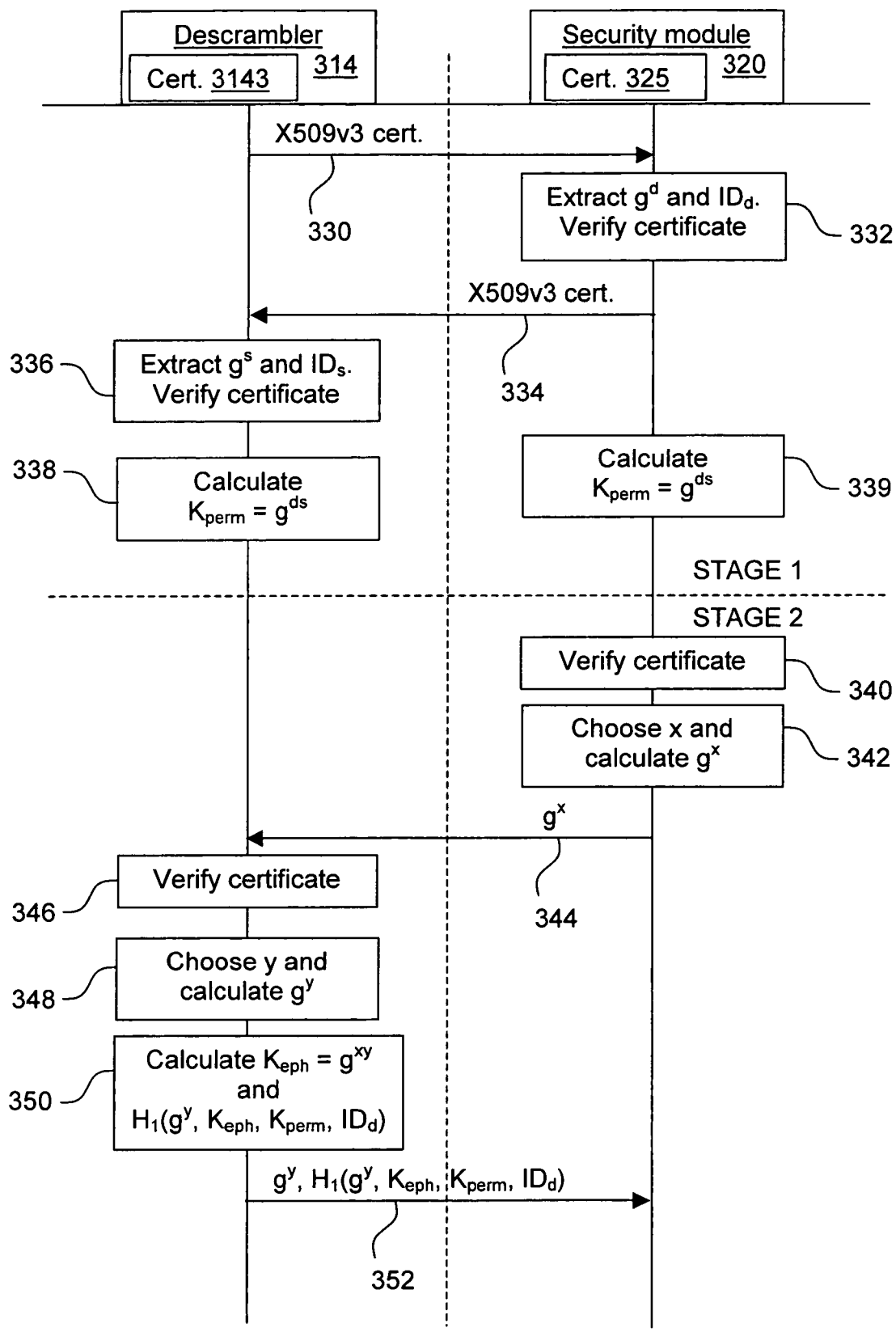
FIG. 5 illustrates an exemplary implementation of the protocol according to the present invention.
Figure 5B:
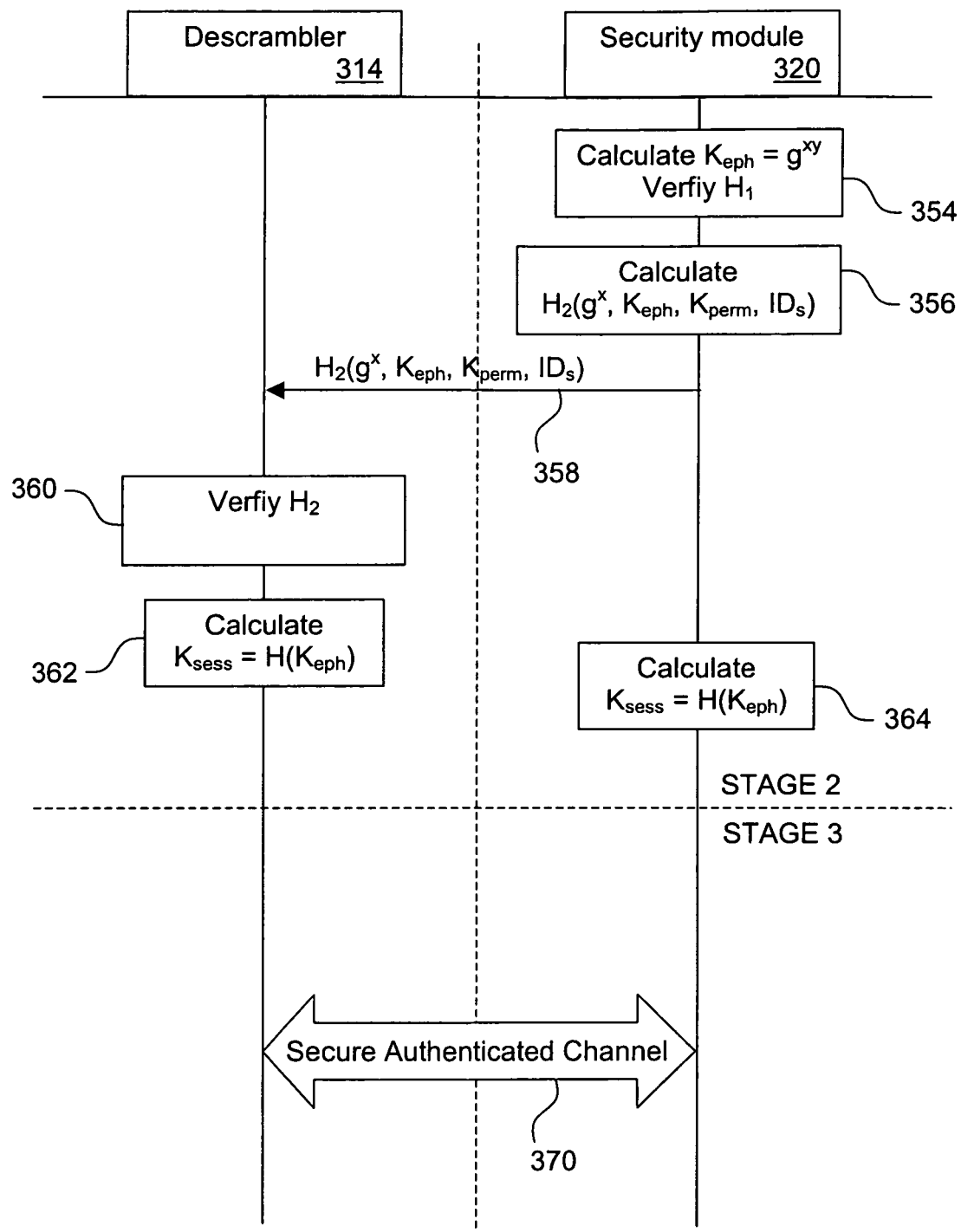

FIG. 5, comprising FIGS. 5A and 5B, illustrates an exemplary implementation of the protocol according to the present invention.

The first stage is executed when the security module 320 is inserted in the security module interface (317 in FIG. 4) of the digital television set (310 in FIG. 4). It should be noted that the first stage may also be executed when the digital television set is switched on, unless for example there are circuits that detect that the security module remains in the security module interface during the entirety of the absence of power.

The descrambler 314 sends its X509v3 certificate 3143 to the security module 320 in message 330. In step 332, the security module 320 extracts the Diffie-Hellman 1024-bit public key $g^d$ and the 64-bit identity $ID_d$ from the received certificate 3143, and verifies the certificate 3143 using the RSASSA-PSS-VERIFY signature verification algorithm with the root authority RSA 1024-bit public key $P_{RA}$. If the certificate 3143 is not valid, the security module 320 aborts the protocol.

The security module 320 then sends its X509v3 certificate 325 to the descrambler 314 in message 334. In step 336, the descrambler 314 extracts the Diffie-Hellman 1024-bit public key $g^s$ and the 64-bit identity $ID_s$ from the received certificate 325, and verifies the certificate 325 using the RSASSA-PSS-VERIFY signature verification algorithm with the root authority RSA 1024-bit public key $P_{RA}$. If the certificate 325 is not valid, the descrambler 314 aborts the protocol.

The descrambler 314 and the security module 320 compute the Diffie-Hellman permanent key $K_{perm}=g^{ds}$ in steps 338 and 339, respectively.

The second stage is executed upon successful execution of the first stage or when an event, such as a freshness trigger, instructs either the descrambler 314 or the security module 320 to renew the session key. In the description hereinafter, the security module 320 starts the second stage, but it should be understood that, since the protocol is symmetric, it may just as well be the descrambler 314 that starts the second stage.

In step 340, the security module 320 verifies the descrambler certificate 3143. If the verification is successful, then the security module 320 chooses a random 1024 bit ephemeral Diffie-Hellman private key x, calculates the corresponding ephemeral Diffie-Hellman public key $g^x$, step 342, and sends the ephemeral public key $g^x$ to the descrambler 314 in message 344.

Upon reception of the message 344, the descrambler 314 first verifies the security module certificate 325 as previously described (and aborts if the verification is not successful), step 346, and chooses a random 1024 bit ephemeral Diffie-Hellman private key y and calculates the corresponding ephemeral Diffie-Hellman public key $g^y$, step 348. In step 350, the descrambler 314 calculates the ephemeral shared key $K_{eph}=g^{xy}$ and the digest $H_1$ of the string comprising $g^y$, $K_{eph}$, $K_{perm}$, and $ID_d$ using the hash algorithm SHA-1. $g^y$ and $H_1$ are sent to the security module 320 in message 352.

FIG. 5B illustrates the continuation of FIG. 5A. Upon reception of message 352, the security module 320 calculates the ephemeral shared key $K_{eph}$ and verifies the received digest $H_1$, step 354. If the received digest does not equal the digest calculated by the security module 320, then the protocol is aborted. However, if the received digest is verified, then, in step 356, the security module 320 calculates the digest $H_2$ of the string comprising $g^x$, $K_{eph}$, $K_{perm}$, and $ID_s$ using the hash algorithm SHA-1. $H_2$ is then sent to the descrambler 314 in message 358.

Upon reception of message 358, the descrambler 314 verifies the received digest $H_2$, step 360. If the received digest is not verified, then the protocol is aborted. However, if the received digest $H_2$ is verified, then, in step 362, the descrambler 314 calculates the session key $K_{sess}$, which is the digest of the string comprising $K_{eph}$.

In step 364, the security module 320 calculates the session key $K_{sess}$ in the same way.

Now that both the descrambler 314 and the security module 320 possess the session key $K_{sess}$, they can go to a third stage in which ECMs are communicated over the Secure Authenticated Channel 370. ECMs are extracted by the demultiplexer (313 in FIG. 4) and passed to the descrambler 314 that forwards them via the security module interface (317 in FIG. 4) to the security module 320 that decrypts them, as is known in the art. The security module 320 then encrypts the ECMs with the session key $K_{sess}$ and sends them, via the security module interface, to the descrambler 314 that decrypts the ECMs with the session key $K_{sess}$ and uses the decrypted ECMs to decrypt digital content.

It should be noted that where this description makes reference to random numbers, these numbers are often in practice pseudo-random.

The expression "security module" encompasses any kind of security module, portable or stationary, that comprises a processor and can be used to establish a secure authenticated channel according to the invention, such as for example smart cards, PC cards (formerly known as PCMCIA cards), and integrated circuits soldered to the Printed Circuit Board of an apparatus such as a television.

While the preferred embodiment refers to a digital television set and a security module, a person skilled in the art will appreciate that the protocol for establishing a secure authenticated channel may be implemented and used by any kind of device with the necessary resources, i.e. a processor and preferably a memory storing the necessary information as detailed hereinbefore. Non-limitative examples of other devices are DVD players, computers interacting with external accessories, and Automatic Teller Machines (ATMs) and bank cards.

What is claimed is:

1. A first device adapted to verify a hash value, the first device having a certificate ($C_a$) comprising a public key ($g^a$) and an identity corresponding to itself ($ID_a$), and knowledge of the identity corresponding to itself ($ID_a$), a private key (a), and the public key ($g^a$), the first device comprising a processor for:
    choosing an ephemeral private key (x);
    calculating a first ephemeral public key ($g^x$);
    sending its certificate ($C_a$) and the first ephemeral public key ($g^x$) to a second device;
    receiving a certificate of the second device ($C_b$), a second ephemeral public key ($g^y$) and a first hash value ($H(g^y, K_{eph}, K_{perm}, ID_b)$) from the second device, the certificate ($C_b$) comprising a public key ($g^b$) and an identity of the second device ($ID_b$), and the first hash value ($H(g^y, K_{eph}, K_{perm}, ID_b)$) being calculated from the second ephemeral public key ($g^y$), an ephemeral shared key ($K_{eph}$), a permanent key ($K_{perm}$), and the identity corresponding to the second device ($ID_b$);
    verifying the certificate of the second device ($C_b$);
    calculating the ephemeral shared key ($K_{eph}$) from the second ephemeral public key ($g^y$) and the ephemeral private key (x);
    calculating the permanent key ($K_{perm}$) from the public key of the second device ($g^b$) and its own private key (a); and
    verifying the first hash value ($H(g^y, K_{eph}, K_{perm}, ID_b)$).

2. The first device of claim 1, wherein the processor is further for:
    calculating a second hash value ($H(g^x, K_{eph}, K_{perm}, ID_a)$) from the first ephemeral public key ($g^x$), the ephemeral shared key ($K_{eph}$), the permanent key ($K_{perm}$), and the identity corresponding to itself ($ID_a$); and
    sending the second hash value ($H(g^x, K_{eph}, K_{perm}, ID_a)$) to the second device.

3. A second device adapted to verify a hash value, the second device having a certificate ($C_b$) comprising a public key ($g^b$) and an identity corresponding to itself ($ID_b$), and knowledge of the identity corresponding to itself ($ID_b$), a private key (b), and the public key ($g^b$), the second device comprising a processor for:
    receiving from a first device a certificate of the first device ($C_a$) and a first ephemeral public key ($g^x$), the certificate comprising a public key ($g^a$) and an identity of the first device ($ID_a$);
    verifying the certificate of the first device ($C_a$);
    choosing an ephemeral private key (y);
    calculating a second ephemeral public key ($g^y$);
    calculating an ephemeral shared key ($K_{eph}$) from the first ephemeral public key ($g^x$) and the ephemeral private key (y);
    calculating a permanent key ($K_{perm}$) from the public key of the first device ($g^a$) and its own private key (b);
    calculating a first hash value ($H(g^y, K_{eph}, K_{perm}, ID_b)$) from the second ephemeral public key ($g^y$), the ephemeral shared key ($K_{eph}$), the permanent key ($K_{perm}$), and the identity corresponding to itself ($ID_b$);
    sending its certificate ($C_b$), the second ephemeral public key ($g^y$) and the first hash value ($H(g^y, K_{eph}, K_{perm}, ID_b)$) to the first device;
    receiving a second hash value ($H(g^x, K_{eph}, K_{perm}, ID_a)$) from the first device, the second value being calculated from the first ephemeral public key ($g^x$), the ephemeral shared key ($K_{eph}$), the permanent key ($K_{perm}$), and the identity corresponding to the first device ($ID_a$); and verifying the second hash value ($H(g^x, K_{eph}, K_{perm}, ID_a)$).

4. A method for verifying a hash value, the method being performed by a first device having a certificate ($C_a$) comprising a public key ($g^a$) and an identity corresponding to itself ($ID_a$), and knowledge of the identity corresponding to itself ($ID_a$), a private key (a), and the public key ($g^a$), the method comprising the steps of:

choosing an ephemeral private key (x);

calculating a first ephemeral public key ($g^x$);

sending its certificate ($C_a$) and the first ephemeral public key ($g^x$) to a second device;

receiving a certificate of the second device ($C_b$), a second ephemeral public key ($g^y$) and a first hash value ($H(g^y, K_{eph}, K_{perm}, ID_b)$) from the second device, the certificate ($C_b$) comprising a public key ($g^b$) and an identity of the second device ($ID_b$), and the first hash value ($H(g^y, K_{eph}, K_{perm}, ID_b)$) being calculated from the second ephemeral public key ($g^y$), an ephemeral shared key ($K_{eph}$), a permanent key ($K_{perm}$), and the identity corresponding to the second device ($ID_b$);

verifying the certificate of the second device ($C_b$);

calculating the ephemeral shared key ($K_{eph}$) from the second ephemeral public key ($g^y$) and the ephemeral private key (x);

calculating the permanent key ($K_{perm}$) from the public key of the second device ($g^b$) and its own private key (a); and verifying the first hash value ($H(g^y, K_{eph}, K_{perm}, ID_b)$).

5. A method for verifying a hash value, the method being performed by a second device having a certificate ($C_b$) comprising a public key ($g^b$) and an identity corresponding to itself ($ID_b$), and knowledge of the identity corresponding to itself ($ID_b$), a private key (b), and the public key ($g^b$), the method comprising the steps of:

receiving from a first device a certificate of the first device ($C_a$) and a first ephemeral public key ($g^x$), the certificate comprising a public key ($g^a$) and an identity of the first device ($ID_a$);

verifying the certificate of the first device ($C_a$);

choosing an ephemeral private key (y);

calculating a second ephemeral public key ($g^y$);

calculating an ephemeral shared key ($K_{eph}$) from the first ephemeral public key ($g^x$) and the ephemeral private key (y);

calculating a permanent key ($K_{perm}$) from the public key of the first device ($g^a$) and its own private key (b);

calculating a first hash value ($H(g^y, K_{eph}, K_{perm}, ID_b)$) from the second ephemeral public key ($g^y$), the ephemeral shared key ($K_{eph}$), the permanent key ($K_{perm}$), and the identity corresponding to itself ($ID_b$);

sending its certificate ($C_b$), the second ephemeral public key ($g^y$) and the first hash value ($H(g^y, K_{eph}, K_{perm}, ID_b)$) to the first device;

receiving a second hash value ($H(g^x, K_{eph}, K_{perm}, ID_a)$) from the first device, the second value being calculated from the first ephemeral public key ($g^x$), the ephemeral shared key ($K_{eph}$), the permanent key ($K_{perm}$), and the identity corresponding to the first device ($ID_a$); and verifying the second hash value ($H(g^x, K_{eph}, K_{perm}, ID_a)$).

* * * * *